Oct. 27, 1953   A. W. JANSEN   2,656,922
APPARATUS FOR GRADING FRUIT ACCORDING TO SIZE
Filed July 26, 1950   2 Sheets-Sheet 1

INVENTOR
ANDRIES W. JANSEN

Oct. 27, 1953 A. W. JANSEN 2,656,922
APPARATUS FOR GRADING FRUIT ACCORDING TO SIZE
Filed July 26, 1950 2 Sheets-Sheet 2

INVENTOR
ANDRIES W. JANSEN

Patented Oct. 27, 1953

2,656,922

UNITED STATES PATENT OFFICE 2,656,922

APPARATUS FOR GRADING FRUIT ACCORDING TO SIZE

Andries Wilhelm Jansen, Rijswijk, Netherlands

Application July 26, 1950, Serial No. 175,911 In the Netherlands August 9, 1949

1 Claim. (Cl. 209—100)

The invention relates to an apparatus for grading or assorting apples and like fruit, said apparatus comprising a laterally inclined conveyer belt which feeds the fruit along a guide arranged at the lower side of the conveyer belt and leaving one or more grading spaces with respect to the belt, the height of which increases in the direction of travel of the belt.

An apparatus of this kind is known, in which the guide means consist of rotating rollers which are arranged with their axis in the longitudinal direction of the belt. At the feeding end of the belt the roller is adjusted to a very low level for dealing with the smaller fruit. The larger fruit is therefore engaged and braked by the roller at such a low point in proportion of its size that its linear velocity is nearly wholly converted into a rolling back motion, whereby stopping and clashing of the fruit occur resulting in a decrease of the output of the apparatus and in damage of the fruit. Moreover the rollers of said known apparatus are to be adjusted separately so that the adjustment of said guide means takes much time and the apparatus is limited to a fixed division of the receptacle for receiving the graded fruit.

The invention has for its object to remove said drawbacks and to this end the guide means have such a shape that the contour lines of the transverse sections of the guide by planes perpendicularly directed to the conveyer belt, which lines contact with the fruit, are enclosing equal angles with the belt. With said shape of the guide all apples or the like will obtain the same velocity which only depends on the angle enclosed between said contour lines and the belt and on the travelling speed of the belt.

The surface of the guide formed by said contour lines may be plain or lightly curved and said surface may slope up in the direction of travel of the conveyer belt, continuously or stepwise for the passage of the fruit. Said contour lines themselves, however, are preferably also step-shaped, so that guiding edges extending in the direction of travel of the belt are obtained and the lowermost of which is terminating the first, whereas the uppermost is continued farthest or vice-versa.

Figures 1, 2:
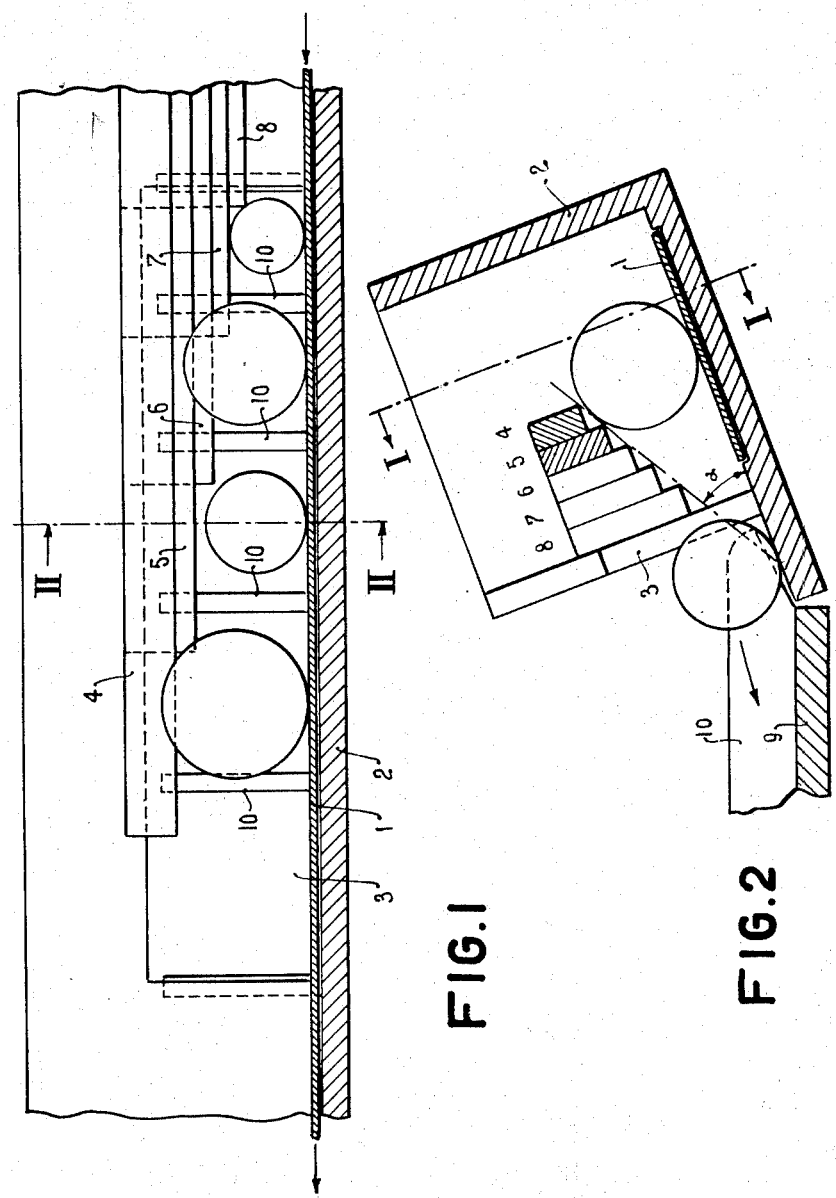
Figure 3:
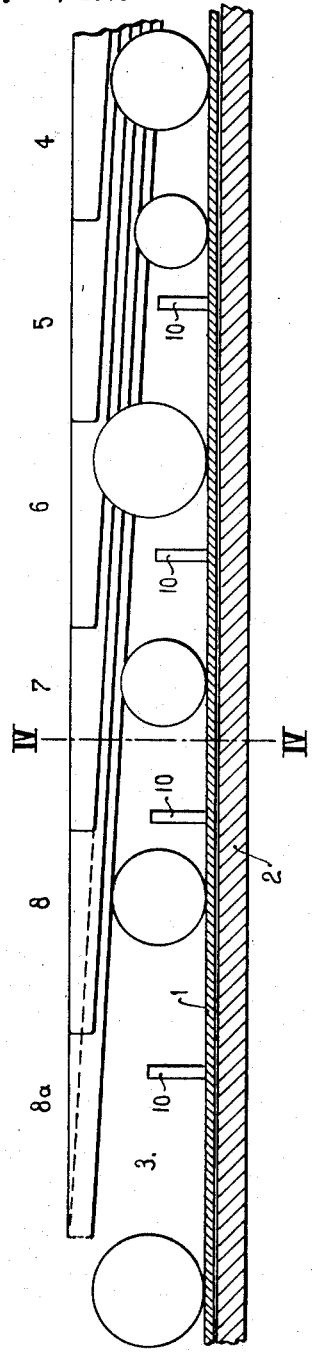

Both said embodiments are diagrammatically illustrated in the accompanying drawings, Figs. 1 and 3 of which show each a longitudinal section of the belt with a side elevation of the guide.

Figure 4:
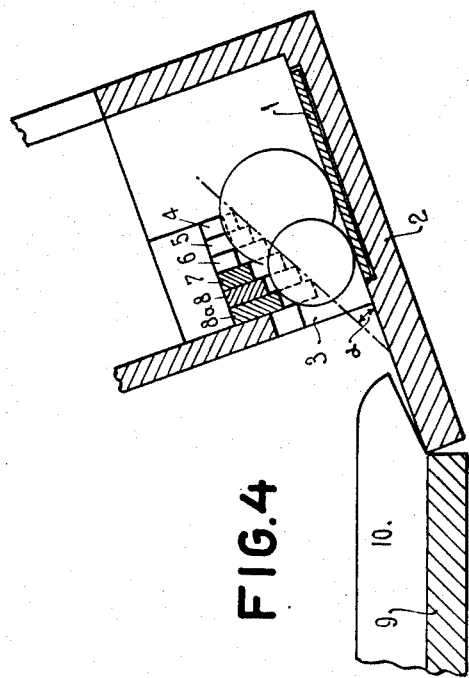

Figs. 2 and 4 are transverse sections taken on line II—II of Fig. 1 and lined IV—IV of Fig. 3 respectively.

The belt 1 travels on the bottom of a laterally inclined gutter 2 having an opening 3 in one of its side walls for the passage of the fruit fed by the belt 1.

A guide is arranged in the gutter 2 at the lower side of the belt and said guide is composed of strips 4, 5, 6, 7 and 8 having a different height so that the body formed by said strips at its lower side is step-shaped in transverse section. The contour line obtained by said step-shape encloses an angle $a$ with the belt 1.

As shown in Fig. 1 the lowermost strip 8 terminates the first for the passage of the smallest apples and the uppermost strip 4 is continued farthest so that the largest apples have to pass through the left hand part of the opening 3. The apples are received into a receptacle 9 which is divided by partitions 10.

With the embodiment according to Figs. 3 and 4 the lower edge of the strips 4, 5, 6, 7, 8 and 8a is inclined upwards in the direction of travel of the belt and the strips terminate at the points where their lower edges reach by their gradual rising such an elevated position that they do not come in contact even with the largest fruit.

The lowermost strip 8a with this embodiment is continued to the front end of the last compartment of the receiving receptacle 9 into which all the fruit larger than a certain size is collected so that said strip serves over its whole length as the proper grading strip. The strip 8a is adjustable so that the adjustment of the guide means may readily be effected. The division of the receiving receptacle 9 may be varied at will by displacing the partitions 10 or by varying the number thereof.

The value of the angle $a$ may not be too small as otherwise the apples would jam. It is stated by way of example that good results may be obtained with an angle $a=30°$.

What I claim is:

In a fruit grading device, a trough having a front wall, a rear wall and a bottom projecting beyond said front wall, the bottom of said trough being inclined downwardly towards the front wall, a belt conveyor supported on the bottom of said trough for movement lengthwise thereof, the lower edge of said front wall being spaced from the bottom to provide a fruit discharge opening, a stationary fruit grading member attached to the front wall of said trough above said belt conveyor, said grading member consisting of a plurality of adjacent parallel longitudinally extending strips, said strips being spaced from the belt different distances to form a series of steps extending in an upwardly inclined direction from the front wall towards the rear wall and successively terminating to form a series of steps creating grading spaces of successively greater height in the travelling direction of the conveyor between the grading member and said belt conveyor, the edges of said first mentioned steps lying in a plane extending upwardly from said wall opening towards the rear wall, said plane forming an acute angle with the upwardly inclined conveyor surface.

ANDRIES WILHELM JANSEN.

References Cited in the file of this patent

UNITED STATES PATENTS

| Number | Name | Date |
|---|---|---|
| 363,084 | Riggs | May 17, 1887 |
| 1,140,782 | Welton | May 25, 1915 |
| 1,245,584 | Hallock | Nov. 6, 1917 |
| 1,448,990 | Balwick | Mar. 20, 1923 |

FOREIGN PATENTS

| Number | Country | Date |
|---|---|---|
| 184,524 | Germany | May 1, 1918 |
| 628,129 | Germany | June 15, 1933 |